(No Model.)
J. SANDERLIN.
FERTILIZER DROPPER AND SEED PLANTER.
No. 302,593. Patented July 29, 1884.
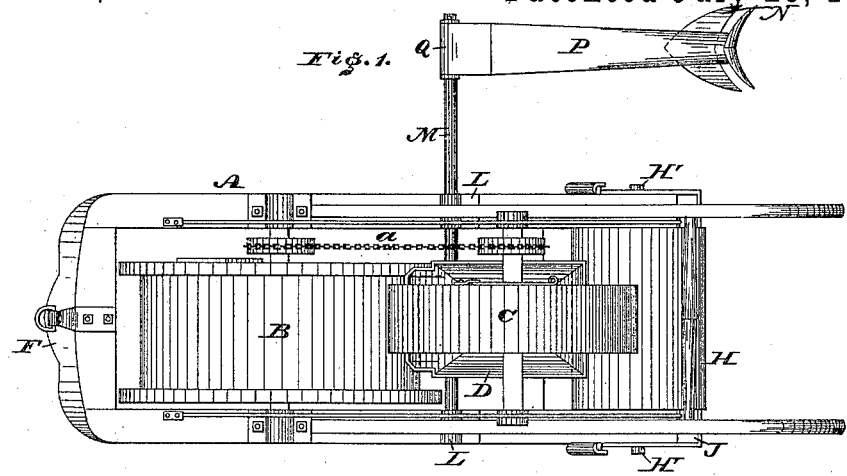
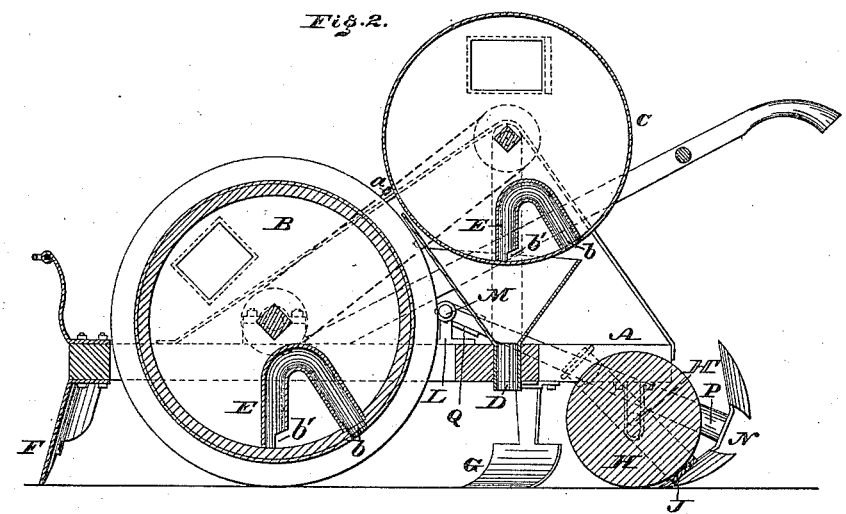
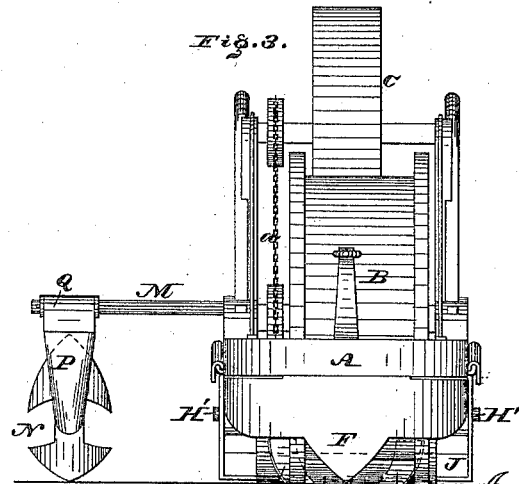
WITNESSES:
A. P. Grant,
W. F. Kircher
INVENTOR:
Jonathan Sanderlin,
BY John A. Wiedersheim
ATTORNEY.

UNITED STATES PATENT OFFICE.

JONATHAN SANDERLIN, OF SALEM, NEW JERSEY.

FERTILIZER-DROPPER AND SEED-PLANTER.

SPECIFICATION forming part of Letters Patent No. 302,593, dated July 29, 1884.

Application filed February 13, 1884. (No model.)

*To all whom it may concern:*

Be it known that I, JONATHAN SANDERLIN, a citizen of the United States, residing at Salem, in the county of Salem, State of New Jersey, have invented a new and useful Improvement in Fertilizer-Droppers and Seed-Planters, which improvement is fully set forth in the following specification and accompanying drawings, in which—

Figure 1 is a top or plan view of a fertilizer-dropper and seed-planter embodying my invention. Fig. 2 is a longitudinal vertical section thereof. Fig. 3 is a front view thereof.

Similar letters of reference indicate corresponding parts in the several figures.

My invention consists of a fertilizer-dropper and seed-planter having a wheel provided with a bent or angular-shaped tube, whereby fertilizers and seed may be regularly and uniformly discharged from said wheel.

Referring to the drawings, A represents the frame of the dropper and planter, on which are mounted the fertilizer-wheel B and the elevated seed-wheel C, the latter overhanging the discharge-spout D, which is properly secured to the frame A. The wheel C receives motion from a chain, belt, or band, $a$, which passes around pulleys on the shafts of the wheels B C, the fertilizer-wheel running on the ground and being thereby rotated, the power thereof being communicated to the wheel C.

Within the wheel C is secured a bent tube, E, one limb of which communicates with an opening, $b$, in the periphery of the wheel C, and the other limb is closed to said periphery, and has an opening, $b'$, adjacent to said periphery, leading into the interior of the wheel or drum C.

Attached to the frame A are a plow-point, F, coverers G, a roller, H, and scraper J, said point being at the front of the frame, said roller and scraper at the rear thereof, the scraper being adapted to clear the roller, and said coverers are at the rear of the lower end of the discharge-spout D.

The wheel or drum B is provided with a tube, E, which is similar to the tube of the wheel or drum C, and is in communication with the interior of said wheel, as at $b'$, and with the periphery of said wheel, as at $b$, so that when the fertilizer reaches the opening $b'$ it enters said tube E, and as the wheel B continues to revolve the fertilizer is carried around the limbs of the tube until it reaches the opening $b'$, whereby it is deposited at intervals on the ground. When the seed reaches the inlet or opening $b'$ of the tube E, the latter being in vertical position, and at what may be termed the "bottom" of the wheel C, a seed, or number of seeds relatively to the size of the opening $b'$, enters the relative limb of said tube, and is carried by the revolution of the wheel to the bend of the tube. As the tube passes the center at top, the seed enters the other limb, and when the tube is at or near the bottom of the wheel the seed is discharged from the tube. Another seed, or more seed, now enters the opening $b'$, and the other operations are continued, so that the seed is uniformly and regularly deposited on the ground.

The passage of the fertilizer through the tube E and deposit or dropping of the same is similar to that of the seed in the wheel C, it being seen that the dropping and planting of fertilizer and seeds are uniformly accomplished and at regular intervals. If desired, the wheels B C may be mounted on separate frames, so that the fertilizer and seed may be dropped and planted at different times; or, if it is desired to drop the fertilizer without the seed, or plant the seed without the fertilizer, it is only necessary to supply the desired wheel with fertilizer or seed, the other wheel remaining empty.

When a furrow is made by the plow or plow-point F, the fertilizer and seed are deposited therein. The coverers G then throw the earth over the fertilizer and seed, and the roller H passes over the earth and properly compresses and levels the same, the scraper J clearing the roller and keeping it comparatively clean. The roller H has its axis fitted in adjustable bearings H', attached to the frame A, so as to rise and fall, due to irregularities of the ground, and the arms of the scraper are connected with the axis of said roller, so that the scraper may also rise and fall with the roller and conform to the position thereof.

Connected with the frame A on each side are eyes L, through which is passed a transversely-extending rod, M.

N represents marking-points projecting in opposite directions from an arm or shank, P, the upper end of which is formed with a boss, Q, in which the rod M is fitted. It will be seen that the arm P may be adjusted on the rod M so as to set the marker N nearer to or farther from the end of said rod, so as to form the marks at different distances apart. Again, the rod M may be removed and placed on the right or left side of the frame A, as desired, without disturbing the adjustment of the marker, the arm P being readily overturned, so that one of the points occupies its proper position on the ground. The points may be entirely raised from the ground, and the entire marking device removed from the frame when the marker is not required, and when service of the same is again required the points may be readily lowered or the rod, &c., reapplied, it also being seen that the rod M is sustained by both eyes L.

Having thus described my invention, what I claim as new, and desire to secure by Letters Patent, is—

1. In a fertilizer-dropper and seed-planter, a drum provided with a bent tube, one limb whereof communicates with the interior of said drum, and the other limb forms a passage leading outside of the drum, substantially as and for the purpose set forth.

2. A drum provided with a bent tube, one limb whereof is in communication with an opening, $b$, of the periphery of said wheel, and the other limb is in communication with the interior of said drum, as at $b'$, substantially as and for the purpose set forth.

JONATHAN SANDERLIN.

Witnesses:
JOHN A. WIEDERSHEIM,
A. P. GRANT.